(12) United States Patent
Tarbell

(10) Patent No.: US 7,930,271 B2
(45) Date of Patent: Apr. 19, 2011

(54) METHOD AND APPARATUS FOR DATA PROCESSING

(75) Inventor: James S. Tarbell, Wellington (NZ)

(73) Assignee: Maximum Availability Ltd., Auckland (NZ)

( * ) Notice: Subject to any disclaimer, the term of this patent is extended or adjusted under 35 U.S.C. 154(b) by 499 days.

(21) Appl. No.: 10/398,609

(22) PCT Filed: Oct. 1, 2001

(86) PCT No.: PCT/NZ01/00206
§ 371 (c)(1),
(2), (4) Date: Oct. 7, 2003

(87) PCT Pub. No.: WO02/31696
PCT Pub. Date: Apr. 18, 2002

(65) Prior Publication Data
US 2004/0059738 A1      Mar. 25, 2004

(30) Foreign Application Priority Data

Oct. 9, 2000  (NZ) ........................................ 507386

(51) Int. Cl.
G06F 7/00        (2006.01)
G06F 17/00       (2006.01)
G06F 13/00       (2006.01)
G06F 13/28       (2006.01)

(52) U.S. Cl. .......................... 707/615; 707/648; 711/162

(58) Field of Classification Search ................ 707/8, 10, 707/202, 101, 615, 648, 999.2, 999.202, 707/999.204; 709/217, 200; 290/40 R; 711/162
See application file for complete search history.

(56) References Cited

U.S. PATENT DOCUMENTS

| | | | | |
|---|---|---|---|---|
| 4,280,060 A * | 7/1981 | Kure-Jensen et al. | ...... | 290/40 R |
| 4,507,751 A * | 3/1985 | Gawlick et al. | ........................ | 1/1 |
| 5,412,801 A | 5/1995 | De Remer et al. | | |
| 5,553,279 A * | 9/1996 | Goldring | ........................ | 707/615 |
| 5,710,881 A * | 1/1998 | Gupta et al. | .................. | 709/200 |
| 5,806,075 A | 9/1998 | Jain et al. | | |
| 5,864,851 A | 1/1999 | Breitbart et al. | | |
| 5,924,096 A * | 7/1999 | Draper et al. | ......................... | 1/1 |
| 5,950,198 A * | 9/1999 | Falls et al. | ............................. | 1/1 |

(Continued)

FOREIGN PATENT DOCUMENTS

CN          1094525 A      11/1994

(Continued)

OTHER PUBLICATIONS

Applicant's Admitted Prior Art, exact date unknown.*

(Continued)

*Primary Examiner* — Mohammad Ali
*Assistant Examiner* — Patrick A Darno
(74) *Attorney, Agent, or Firm* — Pillsbury Winthrop Shaw Pittman, LLP

(57) ABSTRACT

The invention relates to data processing methods and systems including: a method of database replication in which information strings are assigned to serialization groups for processing; a method of memory management in which data is read from a storage space area whilst no data is written to it; a method of replicating a database in which a dynamic table is created to provided processing information for database members; and/or a method of replicating a database wherein tasks are allocated to program components without program components interacting.

19 Claims, 4 Drawing Sheets

U.S. PATENT DOCUMENTS

| | | | |
|---|---|---|---|
| 6,049,809 | A | 4/2000 | Raman et al. |
| 6,243,715 | B1 | 6/2001 | Bogantz et al. |
| 6,272,536 | B1* | 8/2001 | van Hoff et al. .............. 709/217 |
| 6,286,004 | B1* | 9/2001 | Yoshiura et al. ............. 707/615 |
| 6,289,355 | B1* | 9/2001 | Haderle et al. ........................ 1/1 |
| 6,438,558 | B1* | 8/2002 | Stegelmann .................. 707/615 |
| 6,480,858 | B1* | 11/2002 | Boa et al. ..................... 707/713 |
| 6,502,095 | B2* | 12/2002 | Breitbart et al. .............. 707/610 |

FOREIGN PATENT DOCUMENTS

| | | |
|---|---|---|
| EP | 0420425 A | 4/1991 |
| EP | 0724223 A1 | 7/1996 |
| GB | 2 327 781 A | 2/1999 |
| GB | 2 330 220 A | 4/1999 |
| JP | 62-236050 | 10/1987 |
| JP | 03-122729 | 5/1991 |
| JP | 03-122729 A | 5/1991 |
| JP | 03-256146 A | 11/1991 |
| JP | 06-195250 | 7/1994 |
| JP | 06-214915 A | 8/1994 |
| JP | 06-290124 A | 10/1994 |
| JP | 07-244597 | 9/1995 |
| JP | 10-161916 | 6/1998 |
| JP | 2000-047916 A | 2/2000 |
| JP | 2000-132443 A | 5/2000 |
| JP | 2000-222268 A | 8/2000 |

OTHER PUBLICATIONS

Acharya et al., "An Efficient Scheme for Dynamic Data Replication," Department of Computer Science, Brown University (Providence, RI), p. 1-25, ( Sep. 1993).

Sidell, et al., "Data Replication in Mariposa," 1st ed., Department of Electrical Engineering and Computer Sciences, University of California (Berkeley, CA), p. 1-23, ( Jun. 8, 1995).

IBM Corporation, "Bounding Journal Back-Off Recovery of Data Base Replica in Fault-Tolerant Clusters,", IBM Technical Disclosure Bulletin, vol. 36 ( No. 11),pp. 675-678, (Nov. 1, 1993).

Chinese Office Action dated Aug. 3, 2007 for corresponding Application No. 200410095801.7.

Chinese Office Action dated Jan. 26, 2007 for corresponding Application No. 200410095801.7.

Oracle 8 Complete Anatomy—Enhancement in Response to a Large Scale System and a Small Scale System is the same as Oracle 7 in performance. Nikkei Open System, Japan, Nikkei BP Inc., Oct. 15, 1997; vol. 55, pp. 216-225.

* cited by examiner

METHOD AND APPARATUS FOR DATA PROCESSING

This is the U.S. National Stage of International Application PCT/NZ01/00206, filed Oct. 1, 2001, which in turn claims priority to New Zealand Patent Application No. 507386, filed Oct. 9, 2000, the entire contents of both applications are incorporated herein by reference in their entireties.

FIELD OF THE INVENTION

The present invention relates to a method and apparatus for data processing. More particularly, but not exclusively, the invention relates to a method and apparatus for database replication.

BACKGROUND OF THE INVENTION

In a number of data processing applications fragments of data sent from a source system must be processed into a required data format on a target system.

In many instances it is desired to replicate a database on a target computer system from a database on a source system. This process may involve sending journal entries from the source database to allow updating of the target database. Databases may consist of one or more library, each of which contains one or more files, each file having one or more members. Each member consists of a table having one or more rows. A journal entry may contain an identifier of the library; file; file member and a row of changed data for the file member. This journal entry may be used by the target computer system to update its database.

It is important that database entries from a given table are updated in the correct sequence and that inter-related members are updated in the correct sequence. To ensure that journal entries are properly processed a receive process of the target computer system may compare an object name (library/file/member) with a database of objects stored on the target computer system. When a matching object is located the processing information associated with that object may be used to process the journal entry.

The traditional approach has been to transfer journal entries, store them and replicate the database utilising a single engine. This approach is slow and complex.

It would be desirable for a database replication system to meet the following requirements:

1. Ensure that journal entries are serialised by database member (at a minimum), and by any user specified groupings.
2. Support an extremely large number of database apply processes so that database I/O (input/output) can be easily managed.
3. Process journal entries in a way which minimises the amount of system I/O (e.g. paging) between the time the entries are obtained from the journal and the time it is applied to the replica database.
4. The functions support any type of data packets, not just journal entries, to allow for future extensions to other types of replication (e.g. object, stream files etc).
5. The system hides the complexity of the memory management functions from other components.

It is an object of the present invention to provide a method and apparatus for information replication which meets these requirements or to at least provide the public with a useful choice.

DISCLOSURE OF THE INVENTION

According to a first aspect of the invention there is provided a method of replicating information from a source system at a target system comprising the steps of:
  i) receiving information strings from the source system; and
  ii) assigning the information strings to serialisation groups for processing such that inter-related information strings are processed in the same serialisation group.

The information strings may be journal entries from a source database which may be allocated to serialisation groups so that journal entries of the same type, or which are related to other journal entries, are processed in the same serialisation group.

According to a further aspect of the invention there is provided a method of managing memory space in a data transfer operation comprising the steps of:
  i) defining a plurality of storage space areas;
  ii) writing data to a first storage space area; and
  iii) reading data from the first storage space area whilst no data is written to the first storage space area.

The method may enable multiple simultaneous reads from other data storage space areas whilst information is written to only the first storage space area.

According to a further aspect of the invention there is provided a method of replicating a database from a source computer system at a target computer system comprising:
  i) receiving journal entries from the source computer system;
  ii) checking the journal entries to see if an entry exists in a dynamic index giving processing information relating to a database member to which the journal entry relates; and
  iii) if an entry exists in the dynamic table, processing the journal entry according to the associated processing information; or
  iv) if an entry does not exist in the dynamic index, looking up the related processing information for the database member in an assignment database, creating an entry and storing it in the dynamic index; and processing the journal entry according to the processing information.

The entry in the dynamic index may provide information as to whether the member needs to be processed with other members. A journal entry may be temporarily stored before being processed according to the processing information.

According to a further aspect of the invention there is provided a method of replicating a database from a source computer system to a target computer system comprising:
  i) receiving journal entries from the source computer system; and
  ii) allocating program components to process journal entries and update the target database, wherein a control program allocates tasks to program components and controls the program components substantially without program components interacting with one another.

Preferably the target computer system is a multi-processor computer system.

BRIEF DESCRIPTION OF THE DRAWINGS

The invention will now be described by way of example with reference to the accompanying drawings in which.

DETAILED DESCRIPTION OF THE PREFERRED EMBODIMENT

The following description describes a database replication method where the source and target computer systems are IBM AS/400 computers operating under the OS/400 operating system. It will be appreciated that the method is applicable to other systems with appropriate modification.

Figure 1:
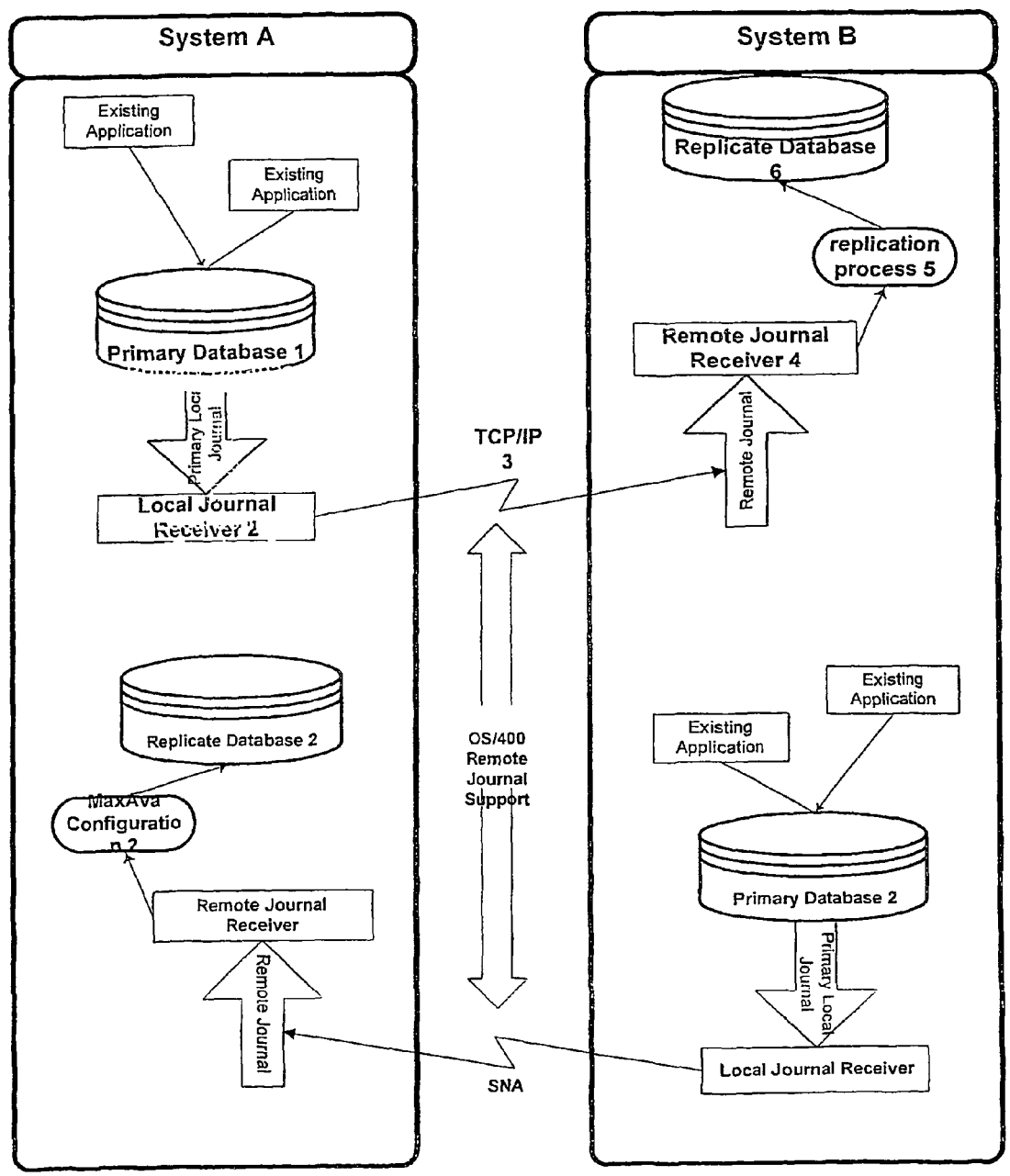
FIG. 1: shows a schematic diagram of a source computer system which provides journal entries to a target computer system.

Referring to FIG. 1, source system A contains a primary database 1. Primary database 1 may contain one or more library. Each library may contain one or more file. Each file may contain one or more members. Each member comprises a table having one or more rows. A unique library/file/member combination is referred to as an object.

When a row of any member of primary database 1 is modified a journal entry including the object name and the modified row is sent to local journal receiver 2. Local journal receiver 2 sends the journal entry via communications link 3 to a remote journal receiver 4 of a target computer system B. A database replication process 5 receives the journal entries and modifies the contents of replica database 6 to maintain it in conformity with primary database 1.

Figure 2:
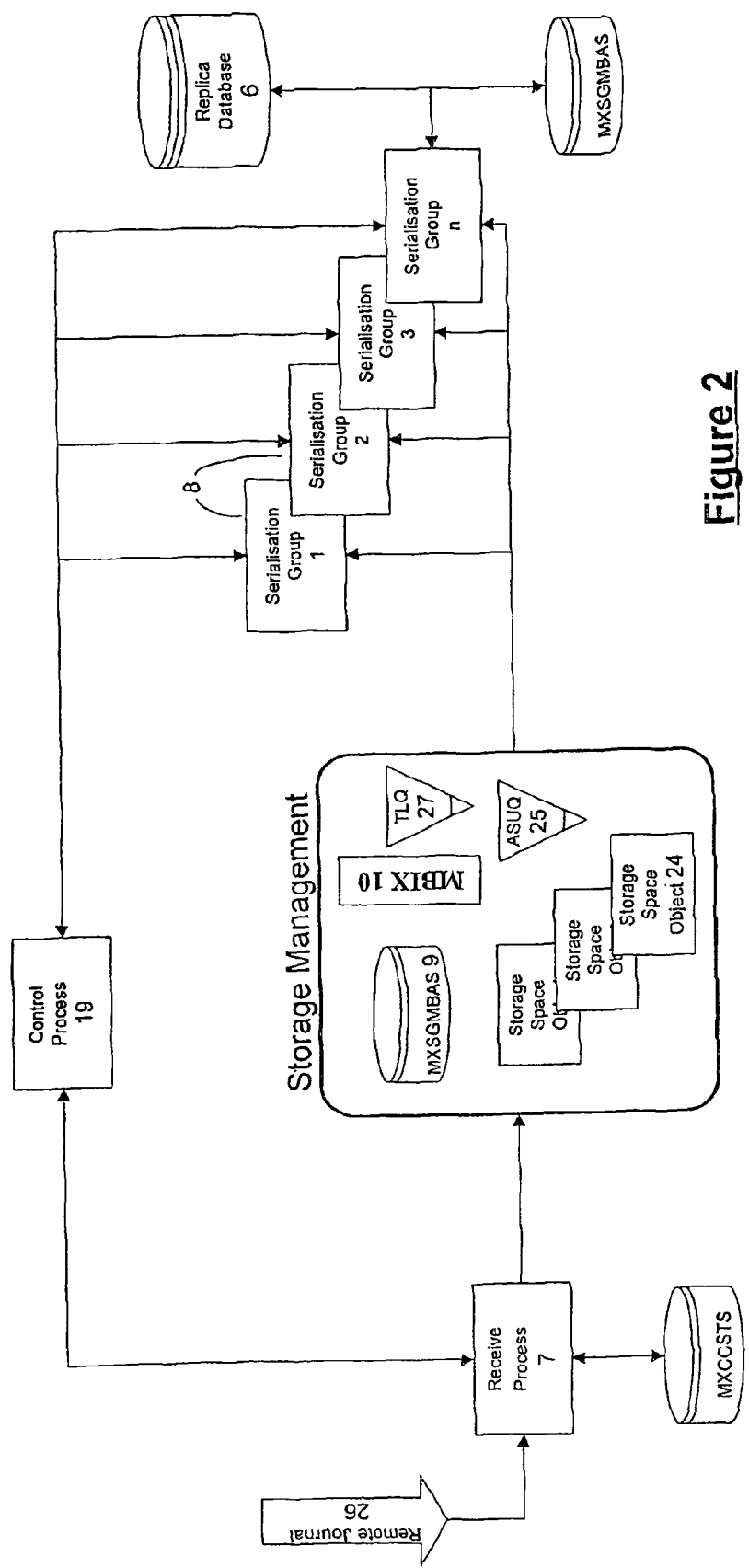
FIG. 2: is a functional diagram illustrating the processes involved in database replication at a target computer system.

Referring now to FIG. 2 the process and apparatus for replicating target database 6 of the target computer system will be described. To ensure proper replication of replica database 6, database members are updated in the replica database 6 in the same order as they are modified in the primary database 1. To achieve this a number of serialisation groups 8 are defined. Journal entries having the same object name are grouped into a common serialisation group so that they are updated in the correct order. Certain database members may have relationships with other database members (joins etc) and so may be assigned to a common serialisation group to ensure all inter-related members are updated in the correct sequence. A serialization group may thus contain journal entries for a number of objects. The use of such serialisation groups enables database replication to be conducted in the appropriate sequence as well as facilitating efficient parallel processing.

Receive process 7 may either assign a received journal entry to a serialisation group, assign a journal entry to a default serialisation group or discard the journal entry. Serialisation group assignment is performed based upon an assignment database (MXSGMBAS) and a temporary OS/400 user index object. The journal entry assignment functions are provided via an ILE service program—which allows the underlying implementation to be modified without recompile/bind of the calling functions.

The assignment database MXSGMBAS contains all objects, their relationship with other objects (i.e. do they need to be grouped with other objects during processing) and their required manner of processing. Assignment of a journal entry to a serialisation group 8 could be conducted simply by comparing the object name of each received journal entry with the assignment database MXSGMBAS and assigning the journal entry to a serialisation group based upon the associated information. However, the assignment database MXSGMBAS contains many objects and considerable processing time is required to, perform a database locate operation and extract the relevant processing information. According to the invention a member assignment (MBIX) index temporary object is used to store processing information for an object. This is an index of objects giving their associated serialisation group and related processing information (including a link to their associated control structures).

Figure 4:
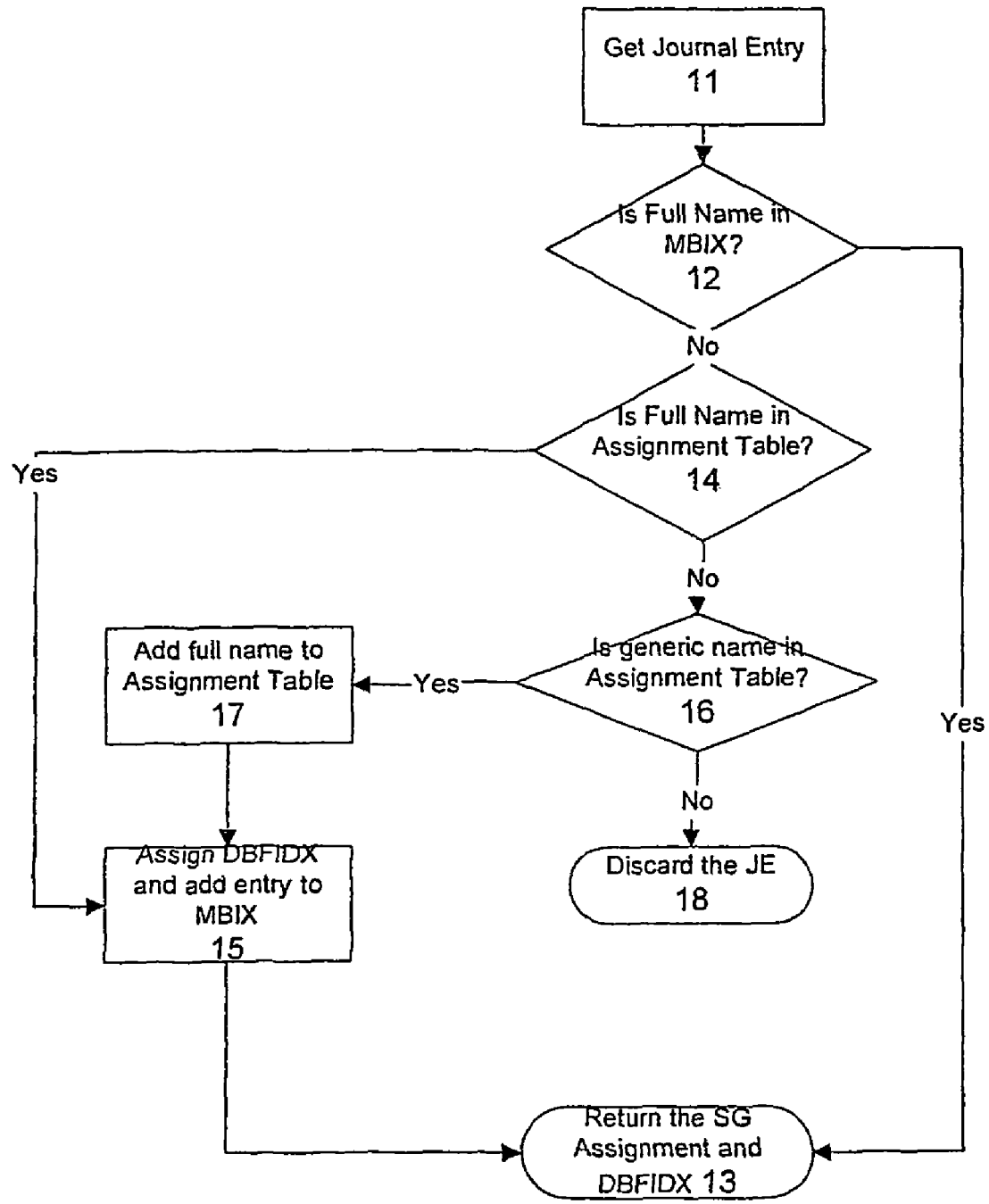
FIG. 4: shows a flow diagram illustrating the process for allocating journal entries to serialisation groups.

Referring now to FIGS. 2 and 4 the serialisation group assignment will be described. When a journal entry is received in step 11 receive process 7 conducts a comparison in step 12 to see whether the object is present in the MBIX index. If so, operation proceeds to step 13 and a serialisation group number and database file index (DBFIDX) is returned and processing continues within the assigned serialisation group.

If the object name is not stored in the MBIX index then a full object name lookup is conducted in the MXSGMBAS database 9 in step 14. If the lookup is successful then a serialisation group is returned, a Database File Index (DBFIDX) is assigned which will point to the processing information stored in a dynamic array maintained by the associated serialisation group and an entry is added to the MBIX index in step 15. Each Database File Index (DBFIDX) is created simply by incrementing an index that is unique by serialisation group.

If a match is not achieved in step 14 then a generic name lookup is conducted in step 16. This involves a search by a library/file /*all and then by library/*all/*all. If a generic match is achieved the full name is added to the MBIX table in step 17 and processing continues in steps 15 and 13 as before. If no match can be achieved the journal entry is discarded in step 18.

Accordingly, at startup, there will be no entries in the MBIX index 10. As journal entries are processed, serialisation groups and the processing information for objects will be added to MBIX index 10. The serialization group and processing information may be much more rapidly obtained from MBIX table 10 than from MXSGMBAS database 9

This method gives the following, significant, performance benefits:
1. The serialisation groups do not need to search for a member's related processing information. They simply maintain the processing information in a dynamic array with the Database File Index as the means of access.
2. All operations relating to a particular member name may refer to the serialisation group and Database File Index value to uniquely identify the member (a "handle").

Figure 3:
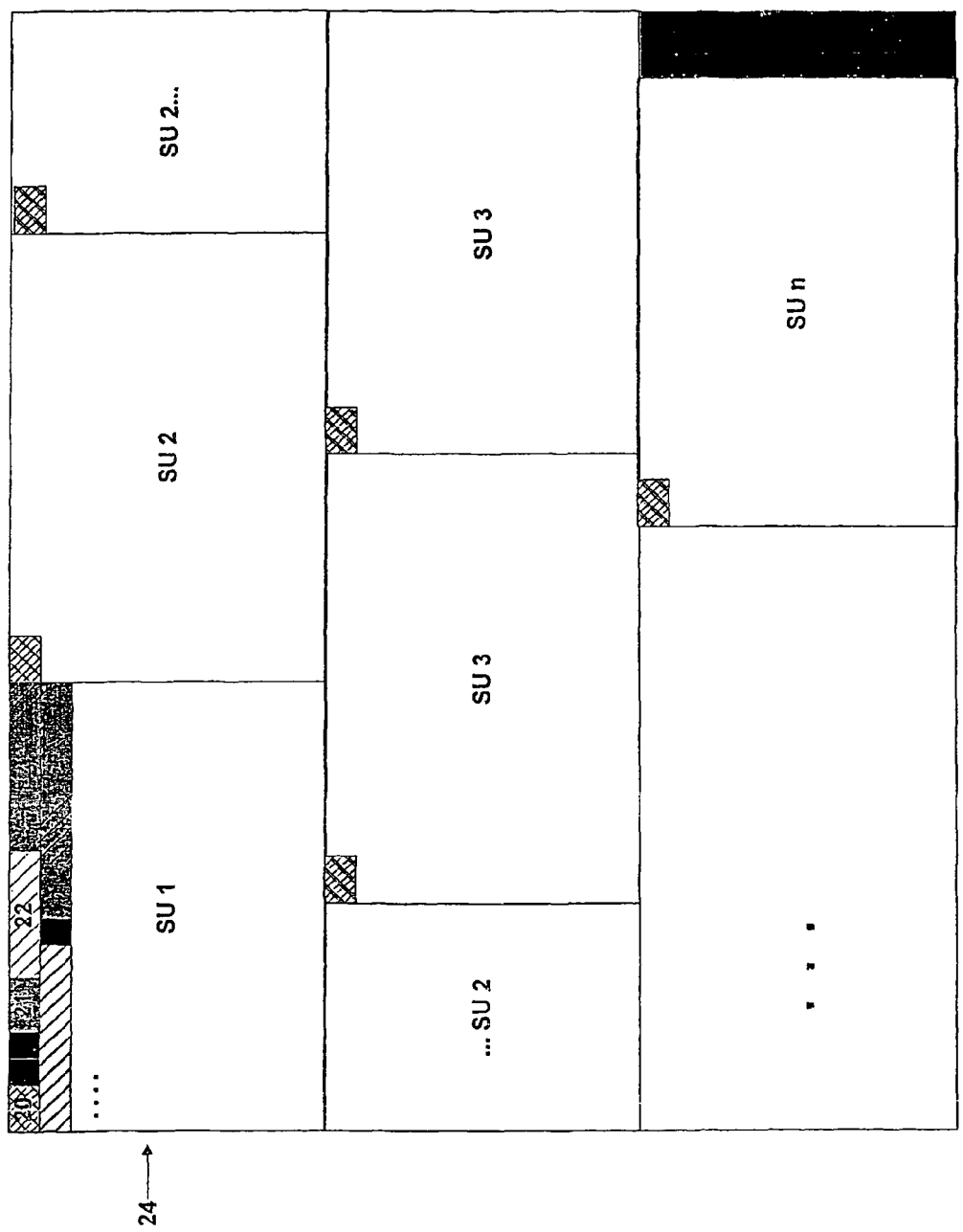
FIG. 3: shows the mapping of storage space within the target computer system.

Referring now to FIG. 3 the method of memory management within the target computer system will be described. Storage object space is divided up into a number of storage units $SU_1$-$SU_N$. Each storage unit has a storage unit header 20. The storage unit header 20 gives the number of serialisation groups which have journal entries in the storage unit. Each data segment consists of a storage entry header 21 and a storage entry 22. Storage entries are aligned on 16 byte boundaries with padding blocks 23 filling any space between an entry and a 16 byte boundary.

Journal entries are passed on from receive process 7 for storage in a storage object space 24. The journal entries from receive process 7 are stored in storage space object 24 in blocks 22. Each journal entry 22 has an associated storage entry header 21 (or handle) which contains information as to the displacement to the next journal entry in the storage unit for that serialisation group and an associated Database File Index (DBFIDX) containing the processing information for the member associated with the journal entry. The processing information is maintained in dynamic memory with the Database File Index as the means of access.

In normal operation journal entries are consecutively written to one storage unit until it is filled and then journal entries are written to the next available storage unit. Once writing to a storage unit has been completed journal entries may be read from the populated storage unit. Partially filled storage units may be read out when system resources are not being otherwise utilised (i.e. no incoming journal entries need to be stored).

This approach means that memory locks are not required during reading and writing. During the writing process the receive process 7 has exclusive access to write to a storage unit. No locks are required during read operations and so journal entries may be simultaneously read to their associated serialisation group. The only locking required is to decrement the value held in storage unit header 20 when the last journal entry for a serialisation group is read out.

The available storage units queue (ASUQ) 25 controls the order in which free storage units are utilised. ASUQ 25 includes a last in first out (LIFO) buffer which stores addresses of free storage units. Journal entries of a serialisation group are read out of a storage unit until a null value is found in a storage entry header. As each storage entry 22 is read out the storage unit header 20 is decremented. When all journal entries are read out completely from a storage unit the storage unit header 20 will be decremented to zero and the storage unit number is returned to the ASUQ and is the first storage unit re-assigned when new journal entries must be written into storage space. In this way the most recently used storage units are maintained active to reduce the working set of storage units to a minimum.

When all journal entries in a storage unit have been read and the storage unit is released the entire address range of the storage unit may be purged without requiring writing of data to auxiliary storage.

Referring again to FIG. 2 the manner of processing will be further described. Control process 19 oversees the replication process and controls processing in the receive process 7 and within the serialisation groups 8. In this manner processing can be conducted within each serialisation group without regard to processing within another serialisation group. By having the whole process controlled by an overarching control process 19 each serialisation group can conduct its processing in isolation without regard to the complexity of the overall operation.

As each serialisation group receives journal entries for a member in sequence the updating of that member in the replica database 6 is sequential also. By processing linked members in a particular serialisation group processing is streamlined.

When a replica database 6 is to be made a primary database partially applied commits must be removed. Firstly, the control process 19 suspends receive process 7 and processing by serialisation groups 8. Control process 19 then identifies all "open" commit groups (e.g. commit IDs that have not yet received a commit or roll back journal entry). These are processed, serially, from the most recent (i.e. the commit group that has the most recent journal entry) to the oldest as follows:

i) a receive process of receive process 7 receives the commit group's journal entries from journal receiver 26;
ii) all entries are assigned to a "default" serialisation group;
iii) the entries are stored in storage unit 24 in the usual manner but are linked in reverse order (i.e. the head of the list is the last entry in the storage unit, with links moving backward until the first entry in the storage unit);
iv) if a storage unit is filled before that commit group's entries are complete, the storage unit is pushed onto LIFO queue TLQ 27 (instead of releasing it to the default serialisation group). Then a new storage unit is allocated (as normal) and entries continue to be stored;
v) when the commit group's available journal entries are completely received and stored in storage units, the storage units are dispatched to the default serialisation groups in LIFO order. The result being that the serialisation group receives the journal entries in reverse order (from most recent to oldest);
vi) the default serialisation group processes the entries as "reverse" entries (the entries include a flag to indicate that they are "reverse" entries). This results in all inserts being processed as deletes, updates being removed to their prior image and deletes being inserted etc. Only journal entries which had already been applied (e.g. during normal processing) to the database are processed;
vii) the default serialisation group does not perform a commit on the "reverse" entries until it receives the "data commit group" journal entry. This ensures that if a failure is encountered during the "clean-up" the database is in a known state. This enables the "clean-up" to be restarted.

Once all of the "open" commit groups have been "removed" the control process 19 suspends the other processes and the replica database is ready to be used as the primary database.

This method allows rapid "clean-up" of partially applied commits which does not require processing capability of the system to be utilised unless a secondary database does in fact have to be made a primary database.

The method and apparatus of the invention provide a number of advantages as follows:

1. The allocation of storage unit blocks within a storage space object and control of read/writes avoids the need for locks and read/write concurrency issues.
2. The use of serialisation groups enables members to be updated in a serial manner and for inter-related members to be updated in correct chronology. Serialisation groups enable multiple streams of journal entries to be simultaneously processed whilst processing interrelated members together.
3. The use of the MBIX index greatly reduces lookup time for each journal entry. The use of storage entry headers 21 (handles) enables the next journal entry of a serialisation group to be located rapidly.
4. The use of a control process to oversee the operation of the receive process and processing within serialisation groups enables the sub-processes to process information efficiently without the need to interact with other processes.
5. Simple handling of commits where secondary database is to be made primary database.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope or spirit of the present invention.

The invention claimed is:

1. A computer-implemented method of replicating information from a source system at a target system in a database replication computing system performed by executing instructions on the computing system, the computer implemented method comprising:
   i) receiving information strings from the source system;

ii) assigning the information strings to a serialization group for processing;

iii) arranging interdependent information strings into a specific serialization group and identifying which serialization group each interdependent information string belongs, wherein the information strings include members that have a database type relationship with other members and are grouped together so that they are arranged to be updated in a correct sequence in the same target system, and wherein each group of interdependent information strings is processed in one of a plurality of serialization groups;

iv) determining if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assigning the information strings to the identified serialization group; and v) processing the serialization groups in parallel to replicate the information from the source system, wherein the processing includes retrieving interdependent information strings that are assigned to the specific serialization group, and applying all interdependent information strings assigned to that specific serialization group in correct chronological order.

2. The computer-implemented method as claimed in claim 1 wherein the information strings are journal entries from a source database.

3. The computer-implemented method as claimed in claim 2 wherein the journal entries are allocated to serialization groups such that journal entries of the same type or related to other journal entries are processed in the same serialization group.

4. The computer-implemented method as claimed in claim 2 wherein, when each database object is first encountered in a processing operation a temporary index object is generated containing the serialization group and related processing information for that database object.

5. The computer-implemented method as claimed in claim 4 wherein, if a temporary index object already exists the serialization group for a database object is assigned based upon the temporary index object data.

6. The computer-implemented method as claimed in claim 4 wherein if a temporary index object does not exist a full object name look up of an assignment database is conducted, the serialization group is obtained from the assignment database and a temporary index object is generated.

7. The computer-implemented method as claimed in claim 1 wherein processing information for a database object is maintained in dynamic memory.

8. A computer readable medium containing a computer program adapted to carry out the method of claim 1.

9. A computer configured to replicate information from a source device, the computer comprising:
a controller in communication with a database, the controller configured to:
receive information strings from a source device;
assign the information strings to serialization groups for processing;
arrange interdependent information strings into a specific serialization group and identifying which serialization group each interdependent information string belongs, wherein the information strings include members that have a database type relationship with other members and are grouped together so that they are arranged to be updated in a correct sequence in the same target system, and wherein each group of interdependent information strings is processed in one of a plurality of serialization groups;
determine if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assign the information strings to the identified serialization group; and
process the serialization groups in parallel to replicate the information from the source device, wherein the controller is configured to process by retrieving interdependent information strings that are assigned to the specific serialization group, and applying all interdependent information strings assigned to that specific serialization group in correct chronological order.

10. A computer-implemented method of replicating information from a source system at a target system in a database replication computing system performed by executing instructions on the computing system, the computer-implemented method comprising:
receiving information strings identifying information to be replicated from the source system;
assigning the information strings to serialization groups for processing;
arranging interdependent information strings into a specific serialization group and identifying which serialization group each interdependent information string belongs, wherein information strings having members that have a database type relationship with other members are grouped together into a set to ensure the members in the same target system are updated in a sequence that correctly replicates the information from the source system, wherein each set is processed in one of a plurality of serialization groups such that the members within a set are processed in sequence;
determining if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assigning the information strings to the identified serialization group; and
processing the serialization groups in parallel to replicate the information from the source system such that members within different sets can be processed out of sequence, wherein the processing includes retrieving interdependent information strings that are assigned to the specific serialization group, and applying all interdependent information strings assigned to that specific serialization group in correct chronological order.

11. A computer configured to replicate information from a source device, the computer comprising:
a controller in communication with a database, the controller configured to:
receive information strings identifying information to be replicated from a source device;
assigning the information strings to serialization groups for processing;
arrange interdependent information strings into a specific serialization group and identifying which serialization group each interdependent information string belongs, wherein the information strings include members that have a database type relationship with other members and are grouped together into a set so that the members in the same target system are arranged to be updated in a sequence that correctly replicates the information from the source system, wherein each set is processed in one of a plurality of serialization groups such that the members within a set are processed in sequence;
determine if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assign the information strings to the identified serialization group; and
process the serialization groups in parallel to replicate the information from the source device such that members within different sets can be processed out of sequence, wherein the controller is further configured to process by retrieving interdependent information strings that are assigned to the specific serialization group, and applying all interdependent information strings assigned to that specific serialization group in correct chronological order.

12. A computer-implemented method of replicating information from a source system at a target system in a database replication computing system performed by executing instructions on the computing system, the computer-implemented method comprising:
receiving information strings identifying information to be replicated from the source system;
assigning the information strings to serialization groups for processing;
arranging interdependent information strings into a specific serialization group and identifying which serialization group each interdependent information string belongs, wherein information strings having members that have a database type relationship with other members are grouped together into a set so that the members are updated in the correct sequence in the same target system, where the database type relationship is one that relies on sequential processing of associated members for database information to be correctly replicated, and wherein each set is processed in one of a plurality of serialization groups such that the members within a set are processed in sequence;
determining if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assigning the information strings to the identified serialization group; and
processing the serialization groups in parallel to replicate the information from the source such that members within different sets can be processed out of sequence, wherein the processing includes retrieving interdependent information strings that are assigned to the specific serialization group, and applying all interdependent information strings to that specific serialization group in correct chronological order.

13. A computer configured to replicate information from a source device, the computer comprising:
a controller in communication with a database, the controller configured to:
receive information strings identifying information to be replicated from a source device;
assign the information strings to serialization groups for processing;
arrange interdependent information strings into a specific serialization group and identifying which serialization group each interdependent information string belongs, wherein the information strings include members that have a database type relationship with other members and are grouped together into a set so that the members are arranged to be updated in a correct sequence in the same target system, where the database type relationship is one that relies on sequential processing of associated members for database information to be correctly replicated, and wherein each set is processed in one of a plurality of serialization groups such that the members within a set are processed in sequence;
determine if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assign the information strings to the identified serialization group; and
process serialization groups in parallel to replicate the information from the source device such that members within different sets can be processed out of sequence, wherein the controller is further configured to process by retrieving interdependent information strings that are assigned to the specific serialization group, and applying all interdependent information strings assigned to that specific serialization group in correct chronological order.

14. A computer-implemented method of replicating information from a source system at a target system in a database replication computing system performed by executing instructions on the computing system, the computer-implemented method comprising:
i) receiving information strings from the source system;
ii) assigning the information strings to serialization groups for processing;

iii) arranging interdependent information strings into a specific serialization group and identifying which serialization group each interdependent information string belongs, wherein information strings having members that have a database type relationship with other members are grouped together to ensure they are updated in the correct sequence in the same target system, and wherein each group of interdependent information strings is processed in one of a plurality of serialization groups; and iv) determining if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assigning the information strings to the identified serialization group; and v) processing the serialization groups in parallel to replicate the information from the source system, wherein processing of interdependent information strings in sequence is conducted in each serialization group without regard to the processing of interdependent information strings within another serialization group, wherein the processing includes retrieving interdependent information strings that are assigned to the specific serialization group, and applying all interdependent information strings assigned to that specific serialization group in correct chronological order.

15. A computer configured to replicate information from a source device, the computer comprising:

a controller in communication with a database, the controller configured to receive information strings identifying information to be replicated from a source device;

assign the information strings to serialization groups for processing;

arrange interdependent information strings into a specific serialization group and identifying which serialization group each interdependent information string belongs, wherein the information strings include members that have a database type relationship with other members and are grouped together into a set so that the members are arranged to be updated in a correct sequence in the same target system, where the database type relationship is one that relies on sequential processing of associated members for database information to be correctly replicated, and wherein each set is processed in one of a plurality of serialization groups such that the members within a set are processed in sequence;

determine if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assign the information strings to the identified serialization group; and process the serialization groups in parallel to replicate the information from the source device such that members within different sets can be processed out of sequence, wherein the controller is further configured to process the interdependent information strings in sequence in each serialization group without regard to the processing of interdependent information strings within another serialization group, retrieve interdependent information strings that are assigned to the specific serialization group, and apply all the interdependent information strings assigned to that specific serialization group in correct chronological order.

16. A method of replicating information from a source system at a target system in a database replication computing system performed by executing instructions on the computing system, the method comprising:

i) receiving information strings from the source system;

ii) assigning the information strings to serialization groups for processing;

iii) arranging interdependent information strings into a specific serialization group and identifying which serialization group each interdependent information string belongs, wherein information strings having members that have a database type relationship with other members are grouped together to ensure they are updated in the correct sequence in the same target system, wherein the database type relationship between members relates the members to the same target system being replicated, enables different actions to be performed on the same member and relies on sequential processing of associated members for database information to be correctly replicated, wherein each group of interdependent information strings is processed in one of a plurality of serialization groups; and iv) determining if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assigning the information strings to the identified serialization group; and v) processing the serialization groups in parallel to replicate the information from the source system, wherein the processing includes retrieving interdependent information strings that are assigned to the specific serialization group, and applying all interdependent information strings assigned to that specific serialization group in correct chronological order.

17. A computer configured to replicate information from a source device, the computer comprising:

a controller in communication with a database, the controller configured to receive information strings identifying information to be replicated from a source device;

assign the information strings to serialization groups for processing;

arrange interdependent information strings into a specific serialization group and identifying which serialization group each interdependent information string belongs, wherein the information strings include members that have a database type relationship with other members and are grouped together into a set so that the members are arranged to be updated in a correct sequence in the same target system, wherein the database type relationship between members relates the members to the same target system being replicated, enables different actions to be performed on the same member and relies on sequential processing of associated members for database information to be correctly replicated, and wherein each set is processed in one of a plurality of serialization groups such that the members within a set are processed in sequence;

determine if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assign the information strings to the identified serialization group; and process the serialization groups in parallel to replicate the information from the source device such that members within different sets can be processed out of sequence, wherein the controller is further configured to process the serialization groups by retrieving interdependent information strings that are assigned to the specific serialization group, and applying all interdependent information strings assigned to that specific serialization group in correct chronological order.

18. A method of replicating information from a source system at a target system in a database replication computing system performed by executing instructions on the computing system, the method comprising:

i) receiving information strings from the source system;

ii) assigning the information strings to serialization groups for processing;

iii) arranging interdependent information strings into a specific serialization group and identifying which serialization group each interdependent information string belongs, wherein information strings having members that have a database type relationship with other members are grouped together to ensure they are updated in the correct sequence in the same target system, wherein the database type relationship between members relates the members to the same target system being replicated, enables different actions to be performed on the same member and relies on sequential processing of associated members for database information to be correctly replicated, and wherein each group of interdependent information strings is processed in one of a plurality of serialization groups; and iv) determining if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assigning the information strings to the identified serialization group; and v) processing the serialization groups in parallel to replicate the information from the source system, wherein processing of interdependent information strings in sequence is conducted in each serialization group without regard to the processing of interdependent information strings within another serialization group, wherein the processing includes retrieving interdependent information strings that are assigned to the specific serialization group, and applying all interdependent information strings assigned to that specific serialization group in correct chronological order.

19. A computer configured to replicate information from a source device, the computer comprising:

a controller in communication with a database, the controller configured to receive information strings identifying information to be replicated from a source device;

assign the information strings to serialization groups for processing;

arrange interdependent information stings into a specific serialization group and identifying which serialization group each interdependent information string belongs, wherein the information strings include members that have a database type relationship with other members and are grouped together into a set so that the members are arranged to be updated in a correct sequence in the same target system, wherein the database type relationship between members relates the members to the same target system being replicated, enables different actions to be performed on the same member and relies on sequential processing of associated members for database information to be correctly replicated, and wherein each set is processed in one of a plurality of serialization groups such that the members within a set are processed in sequence;

determine if received information strings are interdependent by looking up related processing information including a link to control structures for an object in the serialization group for the information strings from a storage module, where the related processing information a) identifies whether the information strings are to be processed with other information strings and b) identifies in which serialization group interdependent information strings are to be processed, and, if it is determined that the information strings are interdependent, assign the information strings to the identified serialization group; and process the serialization groups in parallel to replicate the information from the source device such that members within different sets can be processed out of sequence, wherein the controller is further configured to process the interdependent information strings in sequence in each serialization group without regard to the processing of interdependent information strings within another serialization group, retrieve interdependent information strings that are assigned to the specific serialization group, and apply all the interdependent information strings assigned to that specific serialization group in correct chronological order.

* * * * *